United States Patent
Kiyotani (10) Patent No.: US 11,774,227 B2
(45) Date of Patent: Oct. 3, 2023

(54) INSPECTION GAUGE FOR COORDINATE MEASURING APPARATUS AND ABNORMALITY DETERMINATION METHOD

(71) Applicant: MITUTOYO CORPORATION, Kanagawa (JP)

(72) Inventor: Shingo Kiyotani, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/864,012

(22) Filed: Jul. 13, 2022

(65) Prior Publication Data

US 2023/0024920 A1   Jan. 26, 2023

(30) Foreign Application Priority Data

Jul. 26, 2021 (JP) .................................. 2021-121497

(51) Int. Cl.
*G01B 5/008* (2006.01)
*G01B 5/00* (2006.01)

(52) U.S. Cl.
CPC ........... *G01B 5/008* (2013.01); *G01B 5/0004* (2013.01)

(58) Field of Classification Search
CPC ............................ G01B 5/0008; G01B 21/042
USPC .......................................................... 33/502
See application file for complete search history.

(56) References Cited

U.S. PATENT DOCUMENTS

| | | | | |
|---|---|---|---|---|
| 4,962,591 A * | 10/1990 | Zeller | ................. | G01B 21/042 73/1.79 |
| 6,505,495 B1 * | 1/2003 | Blondeau | ............. | G01B 5/0014 73/1.79 |
| 7,040,033 B2 * | 5/2006 | Zhu | ...................... | G01B 21/042 33/502 |
| 7,810,248 B2 * | 10/2010 | McMurtry | ............. | B25J 9/0057 33/503 |
| 7,841,097 B2 * | 11/2010 | Evans | .................. | G01B 5/0016 33/502 |
| 7,900,367 B2 * | 3/2011 | Sutherland | ........... | G01B 21/042 33/502 |
| 9,683,827 B2 * | 6/2017 | Wimmer | .............. | G01B 21/042 |
| 9,746,303 B2 * | 8/2017 | Nakagawa | ............ | G01B 5/008 |
| 10,323,927 B2 * | 6/2019 | Stigwall | ............... | G01B 5/0014 |
| 10,648,792 B2 * | 5/2020 | Held | ...................... | G01B 11/007 |
| 10,845,192 B2 * | 11/2020 | Lause | .................... | B23Q 17/22 |
| 11,231,273 B2 * | 1/2022 | Meuret | ................ | G01B 21/042 |
| 11,291,425 B2 * | 4/2022 | Kishi | ..................... | A61B 90/06 |

(Continued)

FOREIGN PATENT DOCUMENTS

DE    19720883 A1    11/1998

*Primary Examiner* — George B Bennett
(74) *Attorney, Agent, or Firm* — Greenblum & Bernstein, P.L.C.

(57) ABSTRACT

The inspection gauge is an inspection gauge for a coordinate measuring apparatus having a triangular pyramid shape, and includes a plurality of support members in which first ends are provided at positions corresponding to vertexes of the triangular pyramid and second ends are connected to each other in a region inside the triangular pyramid, and a plurality of spheres provided at positions corresponding to the vertexes of the triangular pyramid on the plurality of support members, and at least three support members of the plurality of support members have mutually different shapes.

12 Claims, 7 Drawing Sheets

(56) References Cited

U.S. PATENT DOCUMENTS

| | | | |
|---|---|---|---|
| 11,293,745 B2 * | 4/2022 | Asanuma | G01B 7/008 |
| 2005/0068523 A1 * | 3/2005 | Wang | H04N 13/254 |
| | | | 356/243.1 |
| 2005/0217127 A1 * | 10/2005 | Hermann | G01C 9/00 |
| | | | 33/365 |
| 2023/0136366 A1 * | 5/2023 | Inoue | G01B 5/012 |
| | | | 33/503 |

* cited by examiner

INSPECTION GAUGE FOR COORDINATE MEASURING APPARATUS AND ABNORMALITY DETERMINATION METHOD

CROSS-REFERENCE TO RELATED APPLICATIONS

The present application claims priority to Japanese Patent Applications number 2021-121497, filed on Jul. 26, 2021. The contents of this applications are incorporated herein by reference in their entirety.

BACKGROUND OF THE DISCLOSURE

Conventionally, as an inspection gauge for a coordinate measuring apparatus, an inspection gauge in which spheres provided at positions corresponding to vertexes of a triangular pyramid are connected with rod members provided at positions corresponding to sides of the triangular pyramid has been known (for example, see German Patent No. 19720883).

When the coordinate measuring apparatus is inspected using a conventional inspection gauge, the positions of four spheres corresponding to the vertexes of the triangular pyramid of the inspection gauge are measured. When it is difficult to distinguish the four spheres in the inspection gauge, the inspection gauge may be placed on the coordinate measuring apparatus with different orientations for every inspection of the coordinate measuring apparatus. Since the positions of the four spheres in the inspection gauge are different depending on tolerances or variations in assembly of members forming the inspection gauge, measurement results may change due to placing the inspection gauge with different orientations. As described above, when the conventional inspection gauge is used, the accuracy of inspection is low since it is difficult to measure a plurality of spheres under a fixed condition for inspection of the coordinate measuring apparatus.

BRIEF SUMMARY OF THE DISCLOSURE

The present disclosure focuses on these points, and an object of the present disclosure is to improve the accuracy of inspection of the coordinate measuring apparatus using the inspection gauge.

An inspection gauge for a coordinate measuring apparatus according to the first embodiment of the present disclosure is an inspection gauge for a coordinate measuring apparatus having a triangular pyramid shape, the inspection gauge for the coordinate measuring apparatus includes a plurality of support members in which first ends are provided at positions corresponding to vertexes of a triangular pyramid and second ends are connected to each other in a region inside the triangular pyramid, and a plurality of spheres provided at positions corresponding to vertexes of the triangular pyramid on the plurality of support members, wherein at least three support members of the plurality of support members have mutually different shapes.

An inspection gauge for a coordinate measuring apparatus according to the second embodiment of the present disclosure is an inspection gauge for a coordinate measuring apparatus having a triangular pyramid shape, the inspection gauge for the coordinate measuring apparatus includes a plurality of support members provided such that first ends of the plurality of support members are at positions corresponding to vertexes of a triangular pyramid, a plurality of rod members in which first ends are coupled to positions corresponding to the vertexes of the triangular pyramid on the plurality of support members, and a plurality of spheres provided at second ends of the plurality of rod members, wherein the plurality of rod members are oriented in the same direction from the first ends to the second ends.

An abnormality determination method according to the third embodiment of the present disclosure includes the steps of placing an inspection gauge for a coordinate measuring apparatus on a coordinate measuring apparatus, wherein the inspection gauge for the coordinate measuring apparatus having a triangular pyramid shape includes i) a plurality of support members in which first ends are provided at positions corresponding to vertexes of a triangular pyramid and second ends are connected to each other in a region inside the triangular pyramid and ii) a plurality of spheres provided at positions corresponding to vertexes of the triangular pyramid on the plurality of support members, wherein the shapes of at least three support members of the plurality of support members are mutually different, measuring a distance to be measured which is a distance between a plurality of spheres of the inspection gauge for the coordinate measuring apparatus using the coordinate measuring apparatus, and determining an abnormality to determine the presence or absence of an abnormality in the coordinate measuring apparatus on the basis of whether or not the distance to be measured is included in an appropriate range determined to be appropriate.

DETAILED DESCRIPTION OF THE DISCLOSURE

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Outline of Three-Dimensional Measuring Apparatus 1>

Figure 1:
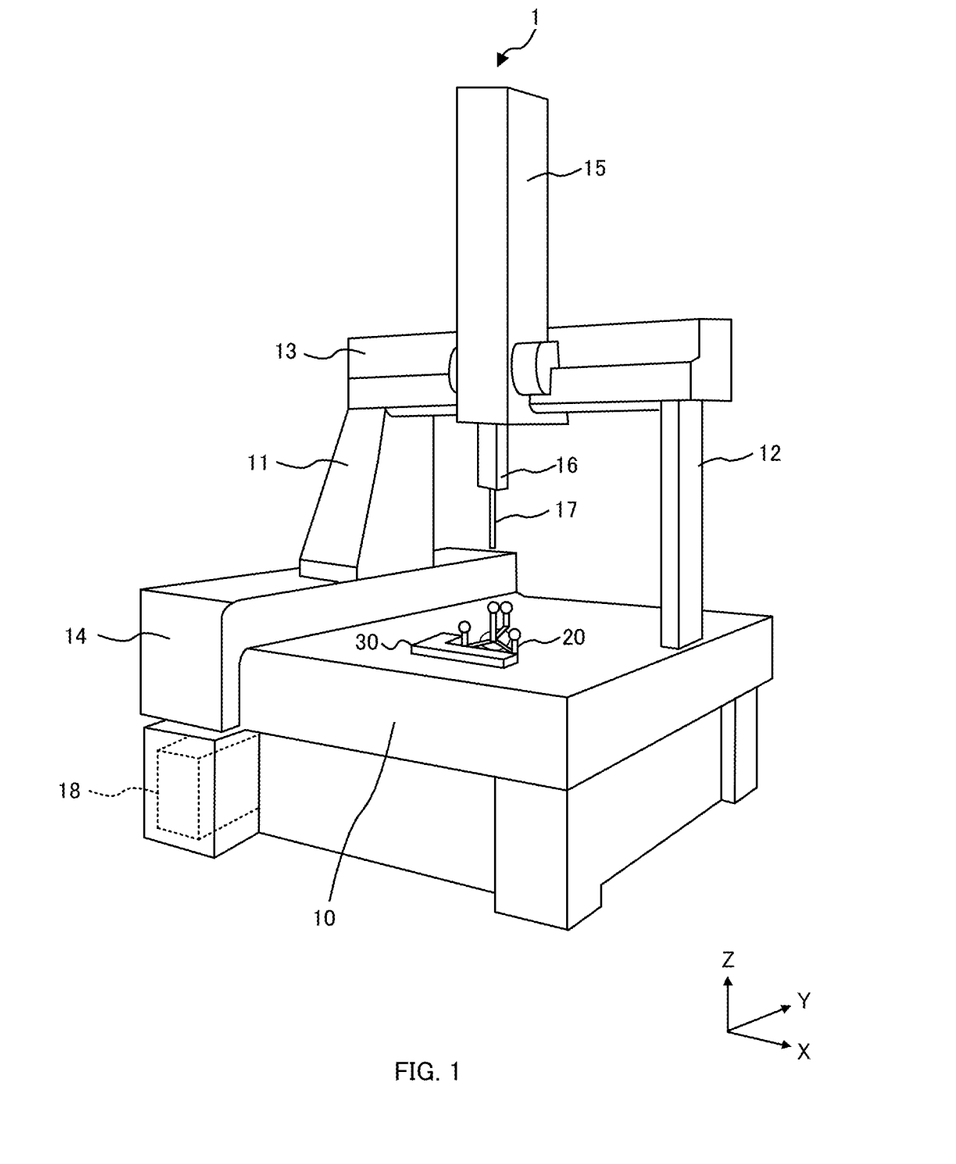
FIG. 1 is for explaining an outline of a three-dimensional measuring apparatus 1 according to the present embodiment.

FIG. 1 is for explaining an outline of a three-dimensional measuring apparatus 1 according to the present embodiment. The three-dimensional measuring apparatus 1 is an example of a coordinate measuring apparatus according to the present embodiment, and the coordinate measuring apparatus includes an apparatus for measuring coordinates by attaching a measurement probe to a machine tool, for example. The three-dimensional measuring apparatus 1 includes a table 10, a column 11, a supporter 12, a beam 13, a Y-axis direction driving part 14, a slider 15, a Z-axis spindle 16, a probe 17, and a control unit 18. In FIG. 1, an inspection gauge 20 which is an inspection gauge for a three-dimensional measuring apparatus having a triangular pyramid shape, and a positioning member 30 for placing the inspection gauge 20 at a predetermined position are placed on the table 10. The user of the three-dimensional measuring apparatus 1 causes the three-dimensional measuring apparatus 1 to measure the inspection gauge 20 in order to inspect the three-dimensional measuring apparatus 1.

Figure 2:
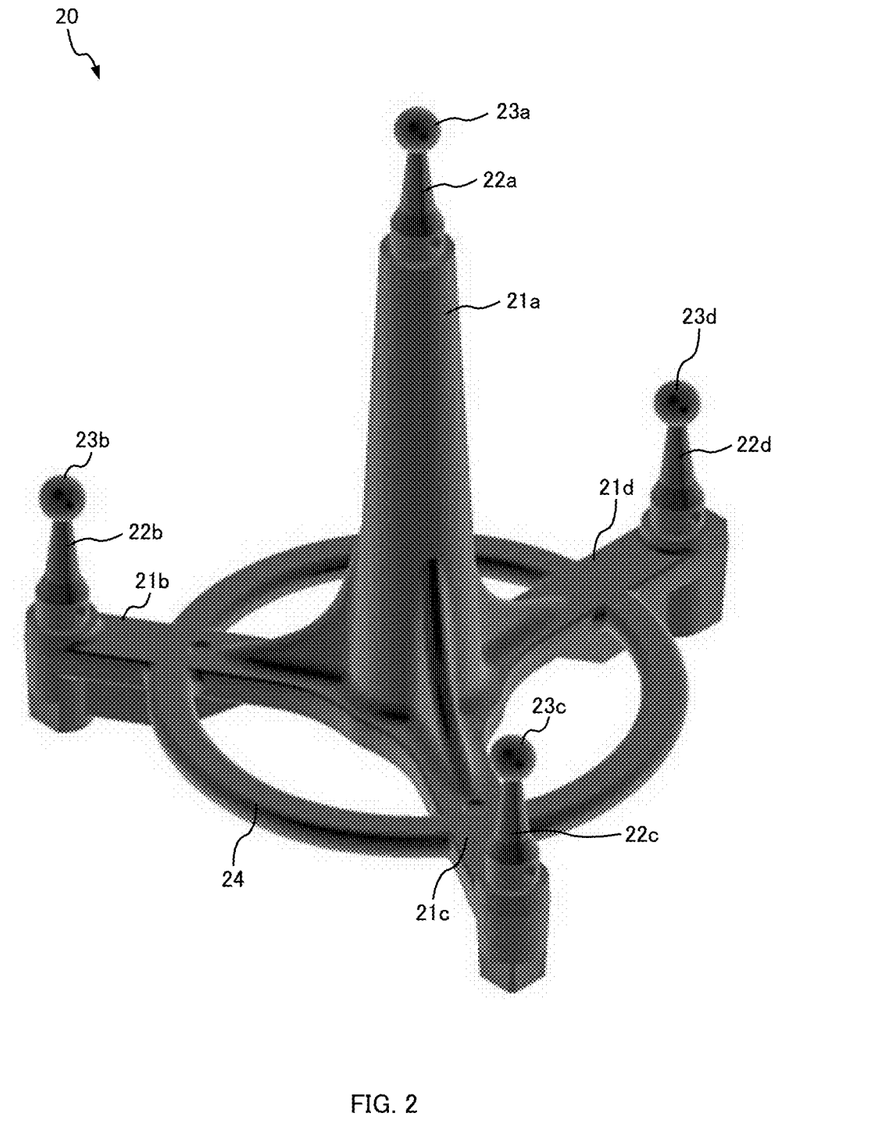
FIG. 2 shows an example of an inspection gauge 20.

FIG. 2 shows an example of the inspection gauge 20. The inspection gauge 20 includes a plurality of support members 21 (a support member 21a, a support member 21b, a support member 21c, and a support member 21d), a plurality of rod members 22 (a rod member 22a, a rod member 22b, a rod member 22c, and a rod member 22d), a plurality of spheres 23 (a sphere 23a, a sphere 23b, a sphere 23c, and a sphere 23d), and a handle 24.

The first ends of the plurality of support members 21 are provided at positions corresponding to the vertexes of the triangular pyramid, and second ends of the plurality of support members 21 are connected to each other in a region inside the triangular pyramid. The first ends of the plurality of rod members 22 are coupled to positions corresponding to the vertexes of the triangular pyramid on the plurality of support members 21, and the sphere 23 is provided at the second end of each of the rod members 22. The plurality of rod members 22 are oriented in the same direction from the first ends to the second ends. The plurality of spheres 23 are to be brought into contact with the probe 17 for the three-dimensional measuring apparatus 1 to measure coordinates. The handle 24 is for the user of the three-dimensional measuring apparatus 1 to move the inspection gauge 20 to a predetermined position.

Referring back to FIG. 1, the three-dimensional measuring apparatus 1 measures coordinates of a plurality of positions to be measured in the inspection gauge 20 by bringing the probe 17 into contact with the inspection gauge 20, which is an object to be measured while moving the probe 17, for example. The plurality of positions to be measured are predetermined locations on the plurality of spheres 23, e.g. the center position of the sphere 23 or a location furthest from the center of the inspection gauge 20 on the sphere 23. When the center position of the sphere 23 is used as the position to be measured, the position to be measured is measured on the basis of coordinates of a plurality of locations on the surface of the spheres contacted by the probe 17.

Specifically, the three-dimensional measuring apparatus 1 moves the probe 17 in the X-axis direction by moving the slider 15 in the X-axis direction along the beam 13. The three-dimensional measuring apparatus 1 moves the probe 17 in the Y-axis direction by causing the Y-axis direction driving part 14 to move a gate section including the column 11, the supporter 12, and the beam 13. The three-dimensional measuring apparatus 1 moves the probe 17 in the Z-axis direction by moving the Z-axis spindle 16 in the Z-axis direction with respect to the slider 15. The three-dimensional measuring apparatus 1 measures coordinates of a plurality of positions to be measured in each of the plurality of spheres 23 while moving the probe 17 in the X-axis direction, the Y-axis direction, and the Z-axis direction.

The control unit 18 has a communication part, and is connected to an information terminal, such as a computer used by the user of the three-dimensional measuring apparatus 1, via a network such as an intranet or the Internet, for example. The control unit 18 and the information terminal used by the user may be connected via a communication line, such as a Universal Serial Bus (USB). The control unit 18 outputs abnormality determination information indicating the presence or absence of an abnormality in the three-dimensional measuring apparatus 1, for example.

Hereinafter, a method of inspecting the three-dimensional measuring apparatus 1 using the inspection gauge 20 will be described with reference to FIGS. 1 and 2. First, the user of the three-dimensional measuring apparatus 1 places the inspection gauge 20 and the positioning member 30 at predetermined positions on the table 10. The positioning member 30 is placed at a position set in advance on the table 10, for example. As an example, the surface of the table 10 where the inspection gauge 20 is placed may be provided with a plurality of concave portions, and the positioning member 30 may have a plurality of convex portions to be inserted into the plurality of concave portions. The user can place the positioning member 30 at the same position for every inspection by inserting the plurality of convex portions of the inspection gauge 20 into the plurality of concave portions of the table 10.

The inspection gauge 20 is placed in a state where a predetermined portion of the inspection gauge 20 is in contact with the positioning member 30. Although details will be described later, the inspection gauge 20 is configured such that the position of the sphere 23 is different when different portions of the inspection gauge 20 contact the positioning member 30. Therefore, the three-dimensional measuring apparatus 1 can detect that the orientation with which the inspection gauge 20 is placed is incorrect when measurement result of the position of the sphere 23 realized by the three-dimensional measuring apparatus 1 deviates greatly from a reference value.

The three-dimensional measuring apparatus 1 measures a position of at least any of the plurality of spheres 23. The three-dimensional measuring apparatus 1 measures the center position of the sphere 23a by bringing the probe 17 into contact with a plurality of locations on the surface of the sphere 23a, for example. The three-dimensional measuring apparatus 1 determines whether or not the inspection gauge 20 is placed with a correct orientation and in contact with the positioning member 30 at an appropriate position on the basis of the measured position of the sphere 23.

When the center position of the measured sphere 23a is within a predetermined range, the three-dimensional measuring apparatus 1 determines that the inspection gauge 20 is placed at the appropriate position with the correct orientation, for example. On the other hand, when the center position of the sphere 23a is out of the predetermined range, the three-dimensional measuring apparatus 1 determines that the inspection gauge 20 is not placed at the appropriate position with the correct orientation. The three-dimensional measuring apparatus 1 outputs position determination information indicating the determination result from the communication part included in the control unit 18.

The three-dimensional measuring apparatus 1 measures a distance to be measured which is the distance between the plurality of spheres 23 of the inspection gauge 20 when it is determined that the inspection gauge 20 is placed at the appropriate position with the correct orientation. The three-dimensional measuring apparatus 1 measures the distance between the plurality of spheres 23 by measuring the center positions of each of the plurality of spheres 23, for example. The three-dimensional measuring apparatus 1 does not measure the distance to be measured when it is determined that the inspection gauge 20 is not placed at the appropriate position with the correct orientation.

The three-dimensional measuring apparatus 1 determines the presence or absence of an abnormality in the three-dimensional measuring apparatus 1 on the basis of whether or not the measured distance is within an appropriate range determined to be appropriate. The three-dimensional measuring apparatus 1 determines that the three-dimensional measuring apparatus 1 is normal when the distance to be measured is included in the appropriate range, and the three-dimensional measuring apparatus 1 determines that the three-dimensional measuring apparatus 1 is abnormal when the distance to be measured is not included in the appropriate range, for example. The three-dimensional measuring apparatus 1 outputs abnormality determination information indicating the presence or absence of an abnormality from the communication part included in the control unit 18.

Thus, the user can place the inspection gauge 20 with the same orientation and at the same position in daily inspections, for example, and so the user can inspect the three-dimensional measuring apparatus 1 without changing measurement conditions. Further, as shown in FIG. 2, each of the plurality of spheres 23 is coupled to the upper side of the rod member 22 in the inspection gauge 20. Therefore, the three-dimensional measuring apparatus 1 does not need to change the orientation of the probe 17 depending on the sphere 23 whose position is to be measured, and there is no error caused by changing the orientation of the probe 17. As a result, the user can improve the accuracy of inspecting the three-dimensional measuring apparatus 1 by using the inspection gauge 20.

<Configuration of Inspection Gauge 20>

Figure 3A:
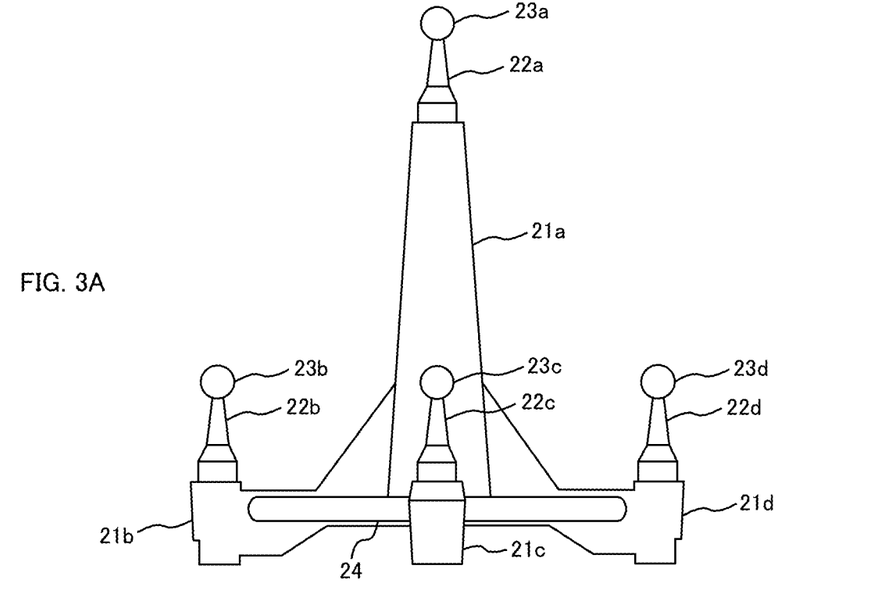
FIGS. 3A to 3B show a configuration of the inspection gauge 20.
Figure 3B:
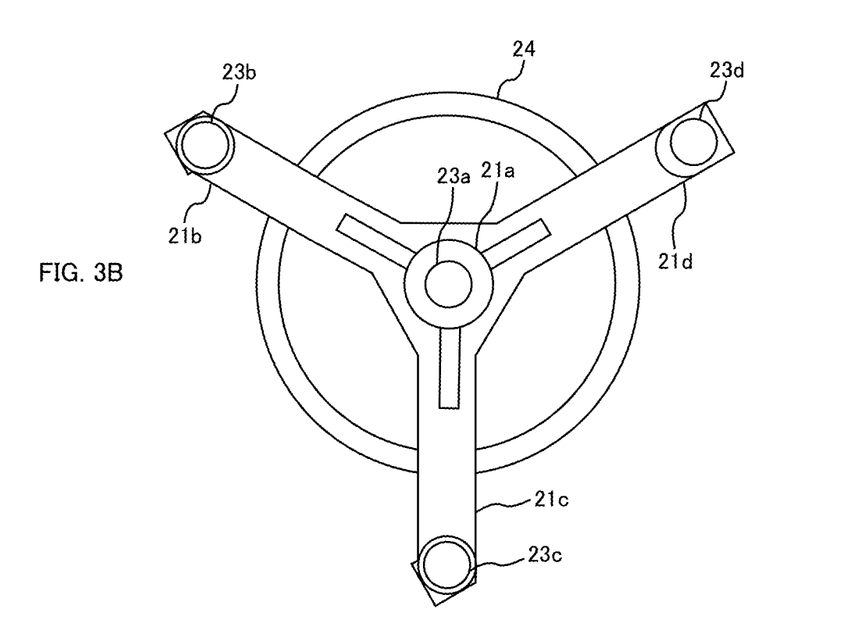

FIGS. 3A to 3B show a configuration of the inspection gauge 20. FIG. 3A is a side view of the inspection gauge 20. FIG. 3B is a top view of the inspection gauge 20. As shown in FIGS. 3A to 3B, the first ends of the plurality of support members 21 are provided at positions corresponding to the vertexes of the triangular pyramid, and the second ends of the plurality of support members 21 are connected to each other in a region inside the triangular pyramid. The first ends corresponding to the vertexes of the triangular pyramid on each of the plurality of support members 21 are provided at positions different from the first ends corresponding to the vertexes of the triangular pyramid on the other support members 21.

The first ends of the plurality of rod members 22 are coupled to positions corresponding to the vertexes of the triangular pyramid on the plurality of support members 21, and a sphere 23 is provided at each of the second ends. As shown in FIGS. 3A to 3B, the plurality of rod members 22 are oriented in the same direction from the first ends to the second ends. The plurality of spheres 23 are provided above the plurality of support members 21. Since the plurality of spheres 23 are coupled to the rod members 22 in this manner, the three-dimensional measuring apparatus 1 can measure the plurality of positions to be measured on the plurality of spheres 23 in a state where the orientation of the probe 17 is the same as the orientation from first ends to the second ends of the plurality of rod members 22. As a result, the three-dimensional measuring apparatus 1 can measure the inspection gauge 20 without changing the orientation of the probe 17, and therefore prevents an error caused by changing the orientation of the probe 17.

Next, the support members 21 will be described in detail. The plurality of support members 21 are formed by one vertical support member which is in a vertical direction when the inspection gauge 20 is used, and three horizontal support members which are in a horizontal direction when the inspection gauge 20 is used, for example. The vertical support member is a support member 21a shown in FIG. 3A, and the horizontal support members are a support member 21b, a support member 21c, and a support member 21d shown in FIG. 3B, for example.

In the inspection gauge 20, at least three support members 21 of the plurality of support members 21 have mutually different shapes. In FIGS. 3A to 3B, the shape of the support member 21a, the shape of the support member 21b or the support member 21c, and the shape of the support member 21d are different from each other. The shape of the support member 21b and the shape of the support member 21c may be the same. The inspection gauge 20 can prevent the user of the three-dimensional measuring apparatus 1 from placing the inspection gauge 20 at an incorrect position or with an incorrect orientation since the shape of the plurality of support members 21 are different in this manner.

Of the plurality of support members 21, the vertical support member, which is the one support member 21 oriented in a vertical direction when the inspection gauge 20 is used, has a different shape than the other plurality of support members 21 in the inspection gauge 20, for example. Specifically, as shown in FIGS. 3A to 3B, the support member 21a, which is the vertical support member, has a different shape than the support member 21b, the support member 21c, and the support member 21d, which are the other plurality of support members. The inspection gauge 20 can prevent the user of the three-dimensional measuring apparatus 1 from placing the inspection gauge 20 with an incorrect orientation since the shape of the plurality of support members 21 are different in this manner.

In the inspection gauge 20, one horizontal support member of the three horizontal support members has a different shape than the other two horizontal support members, for example. In the inspection gauge 20, a width of the one horizontal support member of the three horizontal support members in a direction orthogonal to a longitudinal direction is different from widths of the other two horizontal support members in directions orthogonal to longitudinal directions, for example. Specifically, in the inspection gauge 20, the width of the support member 21d shown in FIG. 3B in the direction orthogonal to the longitudinal direction may be different from the widths of the support member 21b and the support member 21c in the directions orthogonal to the longitudinal directions.

In the inspection gauge 20, the shape of the tip of the one horizontal support member of the three horizontal support members on the side not connected to the other two horizontal support members may be different from the shapes of the tips of the other two horizontal support members on the sides not connected to the one horizontal support member.

Specifically, a flat surface orthogonal to the longitudinal direction of the support member 21d is formed at the tip of the support member 21d shown in FIG. 3B on the side not connected to the other plurality of support members 21. On the other hand, portions protruding in the longitudinal directions of the support member 21b and the support member 21c are formed at the tips of the support member 21b and the support member 21c on the sides not connected to the other plurality of support members 21. The user can distinguish the plurality of support members 21 since the shape of the tip of the one support member 21d of the plurality of horizontal support members is different from the shapes of the tips of the other horizontal support members in this manner.

In addition, the three-dimensional measuring apparatus 1 may be provided with the positioning member 30 having a shape corresponding to the shapes of the tips of the support member 21b and the support member 21c, which are reference horizontal support members that contact the positioning member 30. In this case, the three-dimensional measuring apparatus 1 measures a position of at least any of the plurality of spheres 23, and determines whether or not the measured position is a position in a state where the reference horizontal support members are properly in contact with the positioning member 30. The three-dimensional measuring apparatus 1 determines the presence or absence of an abnormality in the three-dimensional measuring apparatus 1 on condition that the reference horizontal support members are determined to be at positions in contact with the positioning member 30.

Figure 4A:
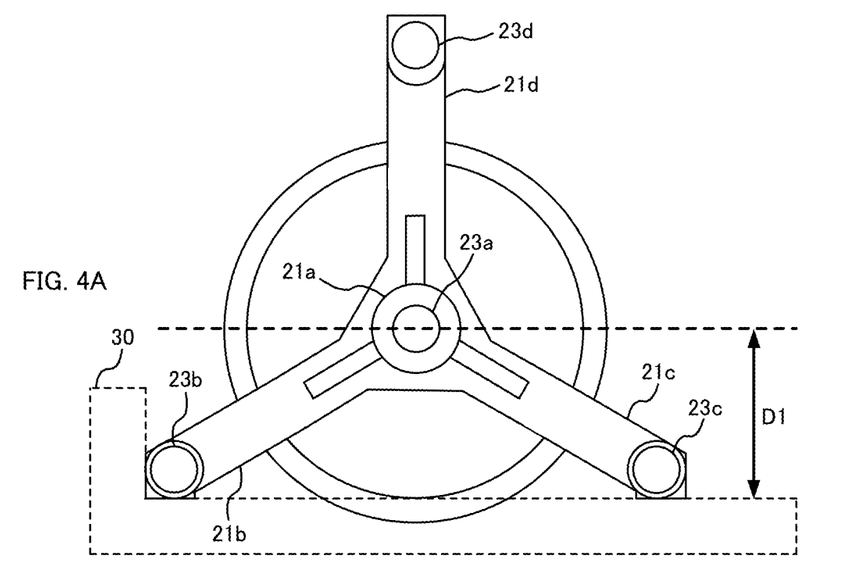
FIGS. 4A to 4B show a state where the inspection gauge 20 and a positioning member 30 are placed.
Figure 4B:
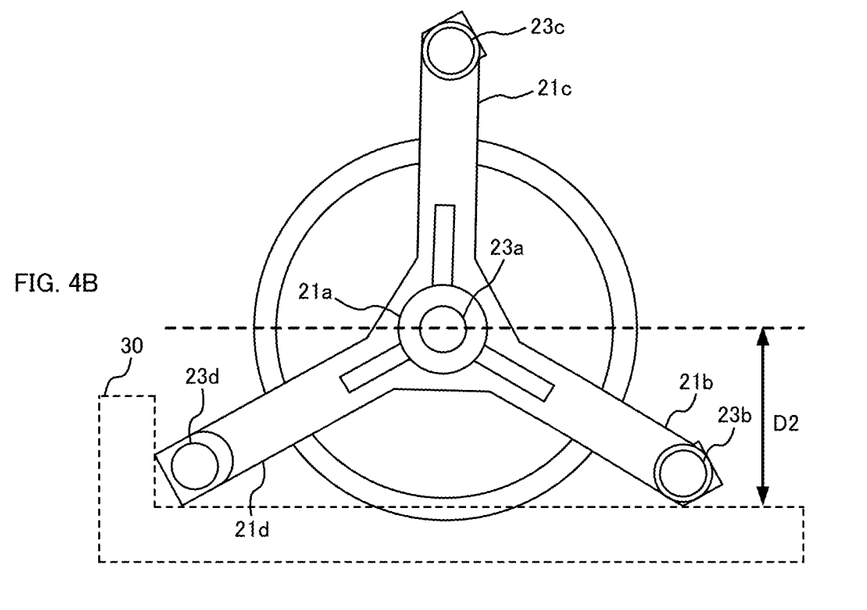

FIGS. 4A to 4B show a state where the inspection gauge 20 is in contact with the positioning member 30. FIGS. 4A to 4B are a top view of the inspection gauge 20 and the positioning member 30 placed on the table 10. FIG. 4A shows a state where the inspection gauge 20 is properly in contact with the positioning member 30. FIG. 4B shows an example of a state where the inspection gauge 20 is not properly in contact with the positioning member 30. The distance D1 and the distance D2 are the distances between the center position of the sphere 23a and the positioning member 30 in the direction orthogonal to the longitudinal direction of the positioning member 30.

FIGS. 4A to 4B show a state where the support member 21b and the support member 21c are properly in contact with a predetermined location of the positioning member 30. As shown in FIG. 4A, in the support member 21b, two surfaces of a plurality of surfaces forming a protruding portion in the longitudinal direction of the support member 21b are properly in contact with the right-angled surfaces of the positioning member 30. In the support member 21c, one surface of a plurality of surfaces forming a protruding portion in the longitudinal direction of the support member 21c is properly in contact with the positioning member 30.

If the user of the three-dimensional measuring apparatus 1 places the support member 21b and the support member 21c, which are the reference horizontal support members, to be in contact with the positioning member 30, the inspection gauge 20 comes into contact with the positioning member 30 properly. Since the inspection gauge 20 comes into contact with the positioning member 30 properly, the user of the three-dimensional measuring apparatus 1 can place the inspection gauge 20 at the same position for every inspection.

On the other hand, FIG. 4B shows an example of a state where the support member 21b and the support member 21c are not properly in contact with predetermined locations on the positioning member 30. As shown in FIG. 4B, in the support member 21b, none of the two surfaces forming a protruding portion in the longitudinal direction of the support member 21b are in contact with the positioning member 30. Further, in FIG. 4B, the support member 21b which is the reference horizontal support member and the support member 21d which is not the reference horizontal support member are in contact with the positioning member 30, and the support member 21c which is the reference horizontal support member is not in contact with the positioning member 30.

In contrast, the shape of the tip of the reference horizontal support member provided to the inspection gauge 20 corresponds to the shape of the positioning member 30. Accordingly, since the shape of the tip of the support member 21 and the shape of the positioning member 30 are different, the user of the three-dimensional measuring apparatus 1 can easily determine that the inspection gauge 20 is not properly in contact with the positioning member 30. As a result, the user of the three-dimensional measuring apparatus 1 can reposition the inspection gauge 20 such that the inspection gauge 20 is properly in contact with the positioning member 30.

The three-dimensional measuring apparatus 1 may determine whether or not the inspection gauge 20 is properly in contact with the positioning member 30 by measuring the inspection gauge 20. The three-dimensional measuring apparatus 1 measures a position of at least any of the plurality of spheres 23 by moving the probe 17, and determines whether or not the inspection gauge 20 is properly in contact with the positioning member 30 on the basis of whether or not the measured position is within a predetermined range, for example. The predetermined range is determined on the basis of a position measured or calculated in advance as the position of the sphere 23 when the inspection gauge 20 is placed at the appropriate position with the correct orientation.

The three-dimensional measuring apparatus 1 measures coordinates of the center position of the sphere 23a, for example. When the measured coordinates of the sphere 23a are within the predetermined range, the three-dimensional measuring apparatus 1 determines that the inspection gauge 20 is properly in contact with the positioning member 30. On the other hand, when the measured coordinates of the sphere 23a are out of the predetermined range, the three-dimensional measuring apparatus 1 determines that the inspection gauge 20 is not properly in contact with the positioning member 30.

The three-dimensional measuring apparatus 1 can notify the user whether or not the inspection gauge 20 is properly in contact with the positioning member 30 by operating in this manner. As a result, when the inspection gauge 20 is not properly in contact with the positioning member 30, the user of the three-dimensional measuring apparatus 1 can reposition the inspection gauge 20 to be properly in contact with the positioning member 30. The three-dimensional measuring apparatus 1 can prevent the inspection gauge 20 from being measured in a state where the inspection gauge 20 is not properly in contact with the positioning member 30.

The three-dimensional measuring apparatus 1 may determine whether or not the inspection gauge 20 is properly in contact with the positioning member 30 on the basis of the distance between the center position of the sphere 23 and the positioning member 30 in the direction orthogonal to the longitudinal direction of the positioning member 30. When the measured distance is the distance D1 shown in FIG. 4A, the three-dimensional measuring apparatus 1 determines that the inspection gauge 20 is properly in contact with the positioning member 30, for example. On the other hand, when the measured distance is the distance D2 shown in FIG. 4B, it is determined that the inspection gauge 20 is not properly in contact with the positioning member 30.

Figure 5A:
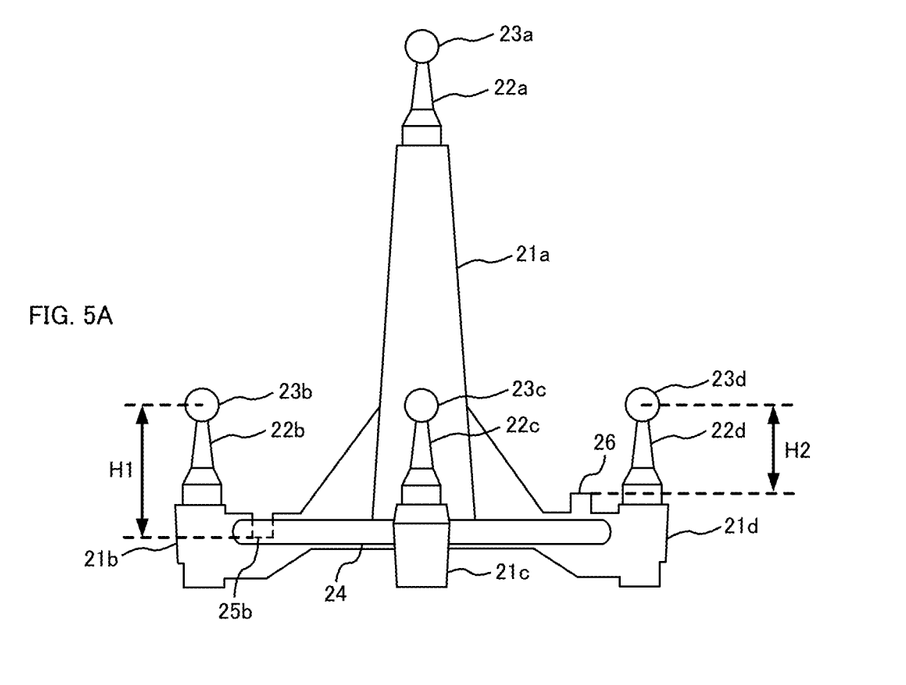
FIGS. 5A to 5B are for explaining a convex portion or a concave portion formed on a horizontal support member.
Figure 5B:
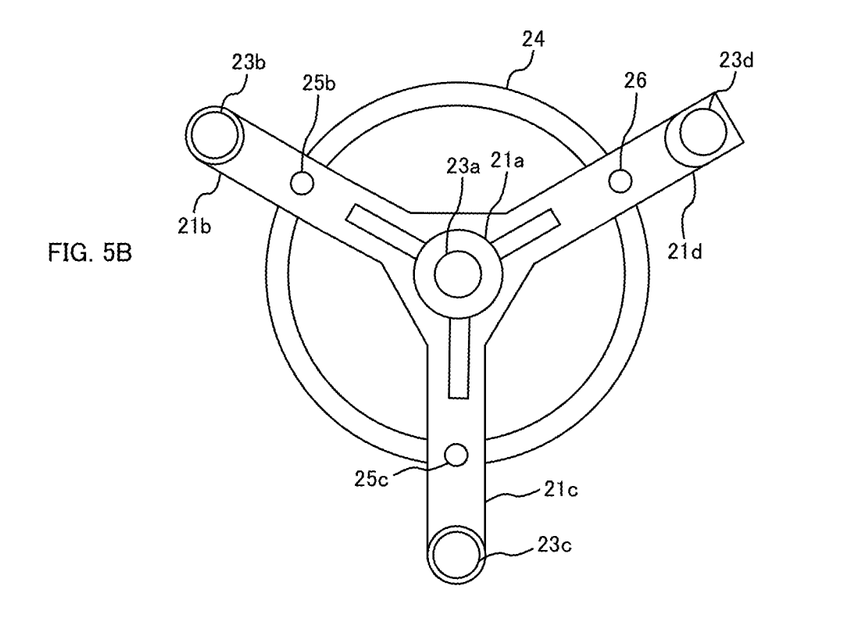

On a surface of one horizontal support member among the three horizontal support members on the side of the vertical support member in the inspection gauge 20, a convex portion or a concave portion having a different shape than the other two horizontal support members may be formed. FIGS. 5A to 5B are for explaining the convex portion or the concave portion formed on the horizontal support member. The inspection gauge 20 shown in FIGS. 5A to 5B differs from the inspection gauge 20 shown in FIGS. 3A to 3B in that the inspection gauge 20 has a plurality of concave portions 25 (a concave portion 25b and a concave portion 25c) and a convex portion 26, and is the same in other respects.

The three-dimensional measuring apparatus 1 measures the distance H1 which is a difference between the coordinates in the Z-axis direction of the center position of the sphere 23b and the coordinates in the Z-axis direction of the lower surface of the concave portion 25b, for example. The three-dimensional measuring apparatus 1 determines that the support member 21b is a reference horizontal support member to be in contact with the positioning member 30, on the basis of the measured distance H1. The three-dimensional measuring apparatus 1 measures the distance H2 which is a difference between the coordinates in the Z-axis direction of the center position of the sphere 23d and the coordinates in the Z-axis direction of the upper surface of the convex portion 26, for example. The three-dimensional measuring apparatus 1 determines that the support member 21d is a support member that does not come into contact with the positioning member 30, on the basis of the measured distance H2.

Since the inspection gauge 20 has such a configuration, the three-dimensional measuring apparatus 1 can determine whether or not the inspection gauge 20 is at a position in contact with the positioning member 30 by measuring the coordinates in the Z-axis direction of the plurality of spheres 23, the plurality of concave portions 25, and the convex portion 26. It should be noted that the plurality of concave portions 25 may be replaced with a plurality of convex portions, and the convex portion 26 may be replaced with a concave portion in the inspection gauge 20.

First Variation Example

Figure 6:
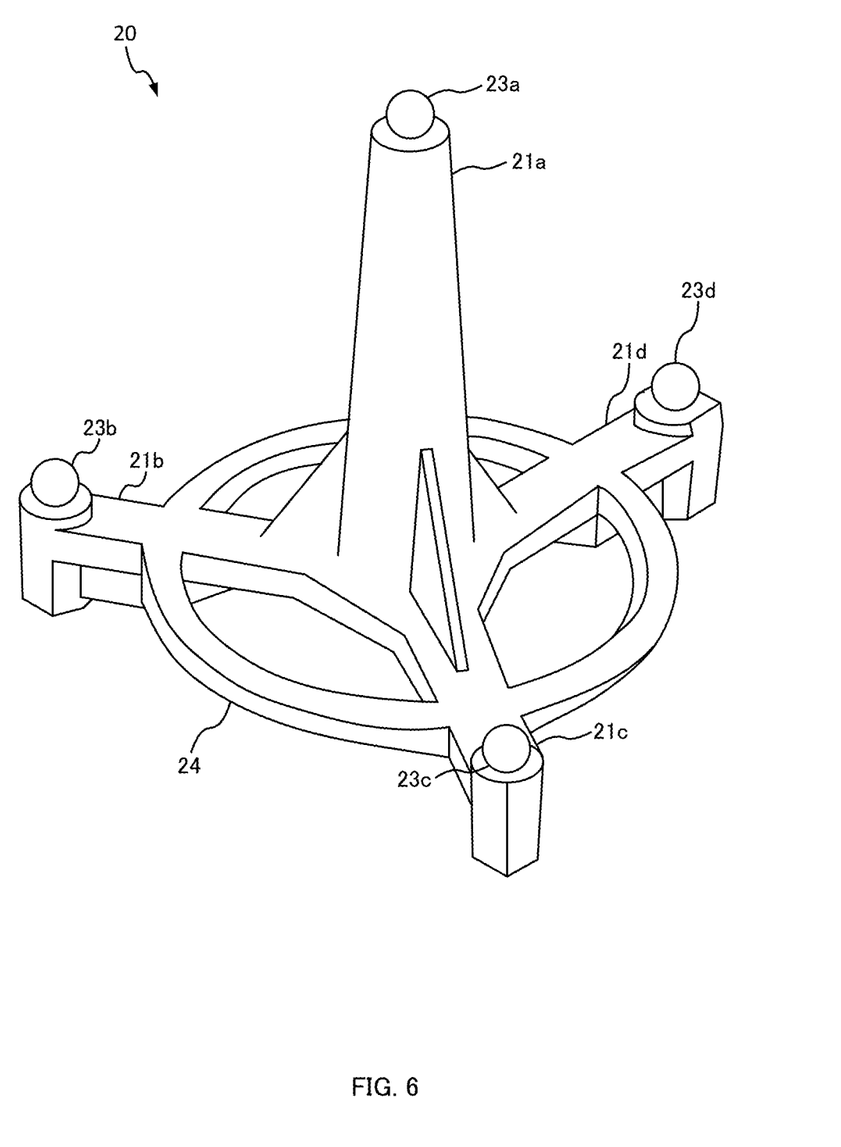
FIG. 6 shows a configuration of the inspection gauge 20 according to the first variation example.

In the above description, a case where the plurality of spheres 23 in the inspection gauge 20 are coupled to the plurality of rod members 22 has been exemplified, but the present disclosure is not limited thereto. FIG. 6 shows a configuration of the inspection gauge 20 according to the first variation example. The inspection gauge 20 shown in FIG. 6 differs from the inspection gauge 20 shown in FIGS. 3A to 3B in that the plurality of spheres 23 are provided at positions corresponding to the vertexes of the triangular pyramid on the plurality of support members 21, and is the same in other respects. Having such a configuration, the inspection gauge 20 does not require the plurality of rod members 22. As a result, the number of members constituting the inspection gauge 20 can be reduced.

Second Variation Example

Figure 7:
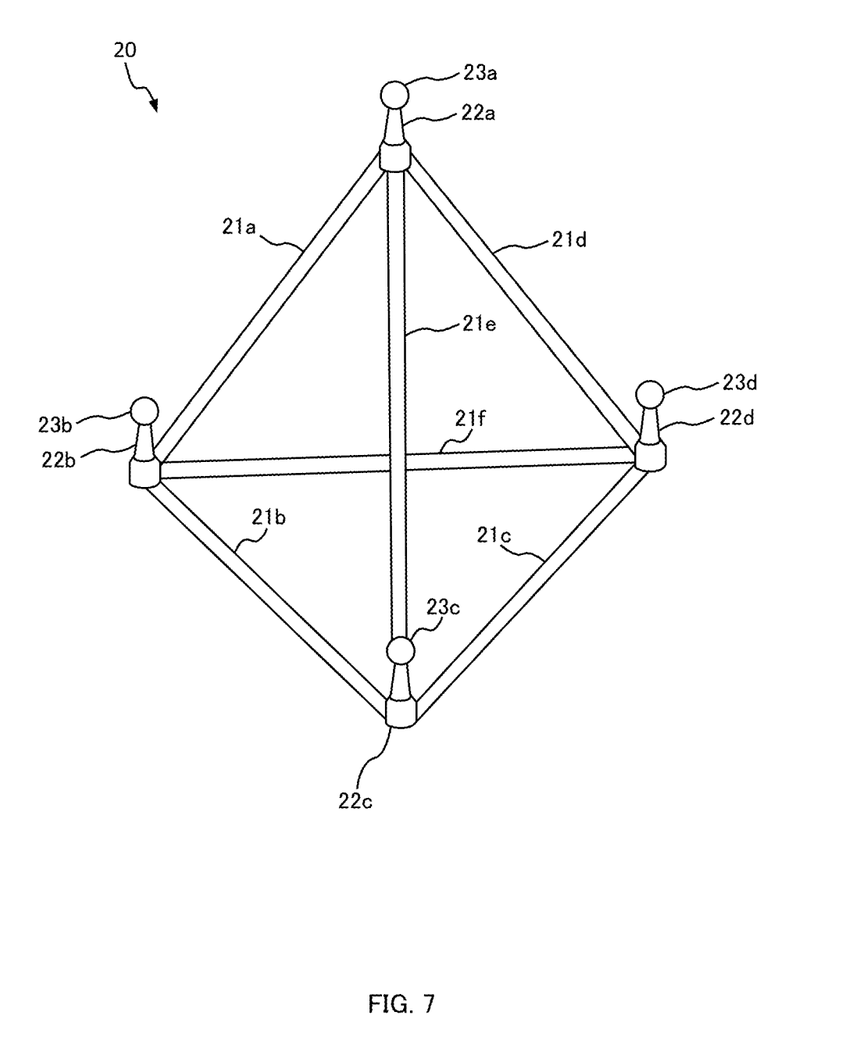
FIG. 7 shows a configuration of the inspection gauge 20 according to a second variation example.

In the above description, a case where the shape of at least three support members 21 of the plurality of support members 21 in the inspection gauge 20 are different from each other has been exemplified, but the present disclosure is not limited thereto. FIG. 7 shows a configuration of the inspection gauge 20 according to a second variation example. The inspection gauge 20 shown in FIG. 7 includes a plurality of support members 21 (a support member 21a, a support member 21b, a support member 21c, a support member 21d, a support member 21e, and a support member 21f), a plurality of rod members 22 (a rod member 22a, a rod member 22b, a rod member 22c, and a rod member 22d), and a plurality of spheres (a sphere 23a, a sphere 23b, a sphere 23c, and a sphere 23d).

The plurality of support members 21 are provided such that first ends of the plurality of support members 21 are at positions corresponding to the vertexes of the triangular pyramid. The first ends of the plurality of rod members 22 are coupled to positions corresponding to the vertexes of the triangular pyramid on the plurality of support members 21, and a sphere 23 is provided at the second end of each of the plurality of rod members 22. The plurality of rod members 22 are oriented in the same direction from the first ends to the second ends.

The three-dimensional measuring apparatus 1 measures a distance to be measured which is the distance between the plurality of spheres of the inspection gauge 20 using the probe 17 in a state where the orientation of the probe 17 is the same as the orientation from the first ends to the second ends of the plurality of rod members 22. The three-dimensional measuring apparatus 1 determines the presence or absence of an abnormality in the three-dimensional measuring apparatus 1 on the basis of whether or not the distance to be measured is included in an appropriate range determined to be appropriate.

Since the inspection gauge 20 has such a configuration, the three-dimensional measuring apparatus 1 can measure a plurality of positions to be measured of the plurality of spheres 23 without changing the orientation of the probe 17. Further, the user of the three-dimensional measuring apparatus 1 can easily place the inspection gauge 20 at an appropriate position and with an appropriate orientation. As a result, the accuracy of measuring the inspection gauge 20 by the three-dimensional measuring apparatus 1 can be improved.

Third Variation Example

In the above description, a case where the sphere 23 is coupled to the first end of the support member 21 or above the first end of the rod member 22 has been exemplified, but the present disclosure is not limited thereto. The orientation with which the sphere 23 is coupled to the support member 21 or the rod member 22 is arbitrary. The sphere 23 may be coupled to a side surface or a lower surface of the support member 21 or the rod member 22, for example.

<Effect by Inspection Gauge 20>

As described above, the inspection gauge 20 includes i) the plurality of support members 21 in which first ends are provided at positions corresponding to the vertexes of the triangular pyramid and the second ends are connected to each other in a region inside the triangular pyramid and ii) the plurality of spheres 23 provided at positions corresponding to the vertexes of the triangular pyramid on the plurality of support members 21. Further, at least three support members 21 of the plurality of support members 21 have mutually different shapes.

Since the inspection gauge 20 has such a configuration, the user of the three-dimensional measuring apparatus 1 can easily place the inspection gauge 20 at an appropriate position on the table 10. Therefore, the three-dimensional measuring apparatus 1 can measure the plurality of positions to be measured of the plurality of spheres 23 without changing the orientation of the probe 17. As a result, the accuracy of measuring the inspection gauge 20 by the three-dimensional measuring apparatus 1 can be improved.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. An inspection gauge for a coordinate measuring apparatus having a triangular pyramid shape, the inspection gauge for the coordinate measuring apparatus comprising:
a plurality of support members in which first ends are provided at positions corresponding to vertexes of a triangular pyramid and second ends are connected to each other in a region inside the triangular pyramid; and
a plurality of spheres provided at positions corresponding to vertexes of the triangular pyramid on the plurality of support members, wherein
at least three support members of the plurality of support members have mutually different shapes.

2. The inspection gauge for the coordinate measuring apparatus according to claim 1, wherein
among the plurality of support members, one support member which is oriented in a vertical direction when the inspection gauge for the coordinate measuring apparatus is used has a different shape than the other plurality of support members.

3. The inspection gauge for the coordinate measuring apparatus according to claim 1, wherein
the plurality of support members are formed by one vertical support member, which is oriented in a vertical direction when the inspection gauge for the coordinate measuring apparatus is used, and three horizontal support members, which are oriented in a horizontal direction when the inspection gauge for the coordinate measuring apparatus is used, and
one horizontal support member among the three horizontal support members has a different shape than the other two horizontal support members.

4. The inspection gauge for the coordinate measuring apparatus according to claim 1, wherein
the plurality of support members are formed by one vertical support member, which is oriented in a vertical direction when the inspection gauge for the coordinate measuring apparatus is used, and three horizontal support members, which are oriented in a horizontal direction when the inspection gauge for the coordinate measuring apparatus is used, and
a width of one horizontal support member among the three horizontal support members in a direction orthogonal to a longitudinal direction is different from widths of the other two horizontal support members in directions orthogonal to longitudinal directions.

5. The inspection gauge for the coordinate measuring apparatus according to claim 3, wherein
a convex portion or a concave portion having a different shape than the other two horizontal support members is formed on a surface of one horizontal support member of the three horizontal support members on the side of the vertical support member.

6. The inspection gauge for the coordinate measuring apparatus according to claim 3, wherein
the shape of a tip of one horizontal support member among the three horizontal support members on the side not connected to the other two horizontal support members is different from the shapes of tips of the other two horizontal support members on the side not connected to the one horizontal support member.

7. The inspection gauge for the coordinate measuring apparatus according to claim 1, comprising:
a plurality of rod members in which first ends are connected to positions corresponding to the vertexes of the triangular pyramid on the plurality of support members and second ends are provided with the spheres, wherein
the plurality of rod members are oriented in the same direction from the first ends to the second ends.

8. An inspection gauge for a coordinate measuring apparatus having a triangular pyramid shape, the inspection gauge for the coordinate measuring apparatus comprising:
a plurality of support members provided such that first ends of the plurality of support members are at positions corresponding to vertexes of a triangular pyramid;
a plurality of rod members in which first ends are coupled to positions corresponding to the vertexes of the triangular pyramid on the plurality of support members; and
a plurality of spheres provided at second ends of the plurality of rod members, wherein
the plurality of rod members are oriented in the same direction from the first ends to the second ends.

9. An abnormality determination method comprising the steps of:
placing an inspection gauge for a coordinate measuring apparatus on a coordinate measuring apparatus, wherein the inspection gauge for the coordinate measuring apparatus having a triangular pyramid shape includes i) a plurality of support members in which first ends are provided at positions corresponding to vertexes of a triangular pyramid and second ends are connected to each other in a region inside the triangular pyramid and ii) a plurality of spheres provided at positions corresponding to vertexes of the triangular pyramid on the plurality of support members, wherein the shapes of at least three support members of the plurality of support members are mutually different;
measuring a distance to be measured which is a distance between a plurality of spheres of the inspection gauge for the coordinate measuring apparatus using the coordinate measuring apparatus; and
determining an abnormality to determine the presence or absence of an abnormality in the coordinate measuring apparatus on the basis of whether or not the distance to be measured is included in an appropriate range determined to be appropriate.

10. The abnormality determination method according to claim 9, wherein
the plurality of support members in the inspection gauge for the coordinate measuring apparatus are formed by one vertical support member, which is oriented in a vertical direction in a state where the inspection gauge for the coordinate measuring apparatus is used, and three horizontal support members, which are oriented in a horizontal direction in a state where the inspection gauge for the coordinate measuring apparatus is used, and the shape of a tip of one reference horizontal support member of the three horizontal support members on the side not connected to other two horizontal support members is different from the shapes of tips of the other two horizontal support members on the side not connected to the reference horizontal support member, and
the coordinate measuring apparatus is provided with a positioning member having a shape corresponding to the shape of a tip of the reference horizontal support member,
the abnormality determination method comprises the steps of:
measuring a position of at least one of the plurality of spheres performed before the measuring the distance to be measured; and determining a position, performed between the measuring the position and the measuring the distance to be measured, to determine whether or not the position of at least one of the plurality of spheres is at a position in a state where the reference horizontal support member is in contact with the positioning member, wherein the determining the position includes performing the determining the abnormality on condition that the reference horizontal support member is determined to be at a position in contact with the positioning member.

11. The abnormality determination method according to claim 10, wherein the determining the position includes determining whether or not the inspection gauge for the coordinate measuring apparatus is properly in contact with the positioning member on the basis of whether or not the position of at least one of the plurality of spheres is within a predetermined range.

12. The abnormality determination method according to claim 10, wherein the determining the position includes determining whether or not the inspection gauge for the coordinate measuring apparatus is properly in contact with the positioning member on the basis of a distance between the center position of the sphere and the positioning member in a direction orthogonal to a longitudinal direction of the positioning member.

* * * * *